United States Patent
Hisamoto

(10) Patent No.: US 8,619,246 B2
(45) Date of Patent: Dec. 31, 2013

(54) OPTICAL NODE APPARATUS, METHOD FOR CHECKING CONNECTION IN NODE APPARATUS AND PROGRAM THEREOF

(75) Inventor: Takuya Hisamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 10 days.

(21) Appl. No.: 13/407,678

(22) Filed: Feb. 28, 2012

(65) Prior Publication Data
US 2012/0224170 A1  Sep. 6, 2012

(30) Foreign Application Priority Data

Mar. 1, 2011 (JP) .................................. 2011-44308

(51) Int. Cl.
 *G01N 21/00* (2006.01)
(52) U.S. Cl.
 USPC ........................................................ 356/73.1
(58) Field of Classification Search
 USPC ........................................................ 356/73.1
 See application file for complete search history.

(56) References Cited

U.S. PATENT DOCUMENTS

| | | | |
|---|---|---|---|
| 6,480,308 B1 * | 11/2002 | Yoshida et al. | 398/16 |
| 2004/0096216 A1 * | 5/2004 | Ito | 398/33 |
| 2006/0045520 A1 | 3/2006 | Nakano et al. | |
| 2009/0257743 A1 * | 10/2009 | Chung et al. | 398/21 |

FOREIGN PATENT DOCUMENTS

JP 4500136 B2 7/2010

* cited by examiner

*Primary Examiner* — Tu Nguyen
(74) *Attorney, Agent, or Firm* — McGinn Intellectual Property Law Group, PLLC

(57) ABSTRACT

An optical node apparatus whose plural function units are connected each other through an optical transmission line includes a control unit which carries out control to send an optical test signal and to stop sending the optical test signal a sending unit which sends the optical test signal on the basis of an instruction issued by the control unit a receiving unit which receives the optical test signal sent by the sending unit through the optical transmission line and a discriminating unit which discriminates whether the receiving unit receives the optical test signal.

12 Claims, 7 Drawing Sheets

OPTICAL NODE APPARATUS, METHOD FOR CHECKING CONNECTION IN NODE APPARATUS AND PROGRAM THEREOF

This application is based upon and claims the benefit of priority from Japanese Patent Application No. 2011-044308, filed on Mar. 1, 2011, the disclosure of which is incorporated herein in its entirety by reference.

TECHNICAL FIELD

The present invention relates to an optical node apparatus, a method for checking a connection in the optical node apparatus, and a program thereof.

BACKGROUND ART

The ROADM system is known as a network technology for controlling wavelengths, which carries signals, through a whole of network by combining the wavelength multiplexing art and the path management art, so that a super high speed transmission network with a large amount of capacity can be operated. ROADM is an abbreviation of "Reconfigurable Optical Add Drop Multiplexer". Hereinafter, the ROADM system may be called "system" for simplicity.

A ROADM system related to the present application will be described with reference to FIG. 7. FIG. 7 is a block diagram showing a configuration of a ROADM node 900 related to the present application.

The ROADM node 900, which is an optical node apparatus, can connect with n-routing (n-directional) optical transmission lines, where n is integer not less than 2. The ROADM node 900 realizes the colorless (wavelength-independent) function, the directionless (not depending on route) function and the contentionless (not depending on contention) function. The ROADM node 900 is an exemplified ROADM node which has a configuration that a transponder unit 941 can connect with any connection port, any route and any wavelength.

The ROADM node 900 includes an apparatus controlling and managing unit 901, a plurality of optical cross-connect units 911 and 912, a plurality of wavelength selecting units 921 and 922, a light splitting and selecting unit 931, and the transponder unit 941.

Connections between the optical cross-connect units 911 and 912, and the wavelength selecting units 921 and 922 respectively, and between the wavelength selecting units 921 and 922, and the light splitting and selecting units 931, and between the light splitting and selecting units 931 and the transponder unit 941 are formed through optical patch cords. The optical patch cord is a short cable with connectors on both ends. To check the connection through the optical patch cord is carried out by the worker's visual inspection.

FIG. 7 shows a configuration of the ROADM node 900 in which a main signal to carry user's information is amplified optically and sent into an optical transmission line B or an optical transmission line C out of n routes. A sending side amplifying part 918 and a sending side amplifying part 920 amplify the main signals optically, and the amplified signals are sent into the optical transmission line B and the optical transmission line C respectively.

Moreover, according to FIG. 7, a receiving side amplifying part 913 or a receiving side amplifying part 914 receives an input signal (main signal) from another node through an optical transmission line A or an optical transmission line D respectively. The received main signal is amplified optically and transferred to the inside of the ROADM node 900. An operation of the ROADM node 900 for each route other than the optical transmission line A and the optical transmission line C is the same as one for the optical transmission line A or the optical transmission line C. Similarly, an operation of the ROADM node 900 for each route other than the optical transmission line B and the optical transmission line D is the same as one for the optical transmission line B or the optical transmission line D.

First, an operation of dropping an optical signal in the ROADM node 900 will be described. The receiving side amplifying part 913 and the receiving side amplifying part 914 of the ROADM node 900, each of which has an optical amplifying function, receive the input signals (main signals) from other nodes through the optical transmission line A and the optical transmission line D respectively out of n routes. Then, the receiving side amplifying part 913 and the receiving side amplifying part 914 amplify the main signals and transfer the amplified main signals to light distributing parts 915 and 916 respectively.

The signal, which is outputted by the receiving side amplifying part 913, is passed through the light distributing part 915, a wavelength selecting part 923 and a receiving light splitting unit 932 to reach to a receiving light switching part 933. The signal, which is outputted by the receiving side amplifying part 914, is passed through the light distributing part 916, a wavelength selecting part 924 and a receiving light splitting part 934 to reach to the receiving light switching part 933. The receiving light switching part 933 selects a signal, which is transferred to a main signal receiving part 942, out of signals received through a plurality of routes, and transfers the selected signal to the main signal receiving part 942.

The main signal receiving part 942 receives a wavelength assigned to the main signal.

The apparatus controlling and managing unit 901 carries out control to send a connection detecting light and to stop sending the connection detecting light, and checks whether an expected connection destination receives the connection detecting light, and judges normality on the connection on the basis of a result of the check. If the apparatus controlling and managing unit 901 can not judge that the connection is normal, the apparatus controlling and managing unit 901 notifies a user of an alert, and advises the user of checking and correcting the connection.

In the case that the apparatus controlling and managing unit 901 judges that a point not connected exists or an optical connector becomes soiled, the apparatus controlling and managing unit 901 notifies the user of the alert, and advises the user of carrying out a work for connecting the units or a work of cleaning the optical connector.

Next, an operation of adding an optical signal in the ROADM node 900 will be described. An output port of a main signal sending part 943 of the transponder unit 941 is connected with a sending light switching part 935 of the light splitting and selecting unit 931. The sending light switching part 935 has a function to select a connection route out of a plurality of routes between the sending light switching part 935 and a sending light splitting part 936 and between the sending light switching unit 935 and a sending light splitting part 937, and sends the signal into the selected route.

A signal, which is outputted by the main signal sending part 943, is passed through the sending light switching part 935, the sending light splitting part 936, an optical coupler part 925 and a wavelength selecting and connecting part 917 to reach to the sending side amplifying part 918. Or, the signal, which is outputted by the main signal sending part 943, is passed through the sending light switching part 935, the sending light splitting part 937, an optical coupler part 926 and a wavelength selecting and connecting part 919 to reach to the sending side amplifying part 920.

The wavelength selecting and connecting part 917 transfers the main signal, which is provided by the optical coupler part 925, toward the sending side amplifying part 918.

Moreover, the wavelength selecting and connecting part 919 transfers the main signal, which is provided by the optical coupler part 926, toward the sending side amplifying part 920.

The apparatus controlling and managing unit 901 carries out the control to send the connection detecting light and to stop sending the connection detecting light. Moreover, the apparatus controlling and managing unit 901 checks whether an expected connection destination receives the connection detecting light, and judges the normality on the connection on the basis of a result of the check. If the apparatus controlling and managing unit 901 can not judge that the connection is normal, the apparatus controlling and managing unit 901 issues a rumbling alert, and advices the user of checking and correcting the connection.

In the case that a reflection light is detected, the apparatus controlling and managing unit 901 judges that a point not connected exists or an optical connector becomes soiled, and consequently the apparatus controlling and managing unit 901 issues the rumbling alert, and advises the user of carrying out the work for the connection or the work of cleaning the optical connector.

Due to the colorless function, the directionless function and the contentionless function of the ROADM node 900, it is complicated to arrange an optical path through setting an adding and dropping of the optical wavelength. For this reason, it is complicated to connect the internal units each other through the optical patch cord, and it is not easy to check the normality on the connection. As a result, a false connection is caused, and furthermore interference with the operative main signal is caused due to the false connection. Then, a communication failure may be caused in some cases.

Furthermore, it is possible that the above-mentioned ROADM node can connect with the n-routing optical transmission lines and realize the colorless function, the directionless function and the contentionless function. Moreover, it is possible that the transponder unit connects with any connection port, any route and any wavelength. For this reason, it is possible that the ROADM node connects with any connection port, any route and any wavelength through connecting the internal units each other through the optical patch cord and setting the adding and dropping of the optical wavelength. However, a work of checking whether the optical patch cord is connected correctly is carried out by the worker's visual inspection. Japanese Patent Publication No. 4500136, which is related to the present invention, describes a configuration of an optical transmitter which has a function to detect the false connection.

SUMMARY

An exemplary object of the invention is to provide an optical node apparatus, a method for checking a connection in the optical node apparatus, and a program thereof which can avoid a false connection and interference with a main signal of an operative system due to the false connection.

An optical node apparatus whose plural function units are connected each other through an optical transmission line according to an exemplary aspect of the invention includes a control unit which carries out control to send an optical test signal and to stop sending the optical test signal, a sending unit which sends the optical test signal on the basis of an instruction issued by the control unit, a receiving unit which receives the optical test signal sent by the sending unit through the optical transmission line and a discriminating unit which discriminates whether the receiving unit receives the optical test signal.

A method for checking a connection inside an optical node apparatus whose plural function units are connected each other through an optical transmission line according to an exemplary aspect of the invention includes controlling to send an optical test signal and to stop sending the optical test signal in a control unit, sending the optical test signal on the basis of an instruction issued by the control unit in a sending unit, receiving the optical test signal, which is sent by the sending unit, through the optical transmission line in a receiving unit and judging whether the receiving unit receives the optical test signal in a judging unit.

A storage medium according to an exemplary aspect of the invention records substantively a program to check a connection in an optical node apparatus whose plural function units are connected each other through an optical transmission line. The program executes the steps which include controlling to send an optical test signal and to stop sending the optical test signal in a control unit, sending the optical test signal on the basis of an instruction issued by the control unit in a sending unit, receiving the optical test signal, which is sent by the sending unit, through the optical transmission line in a receiving unit and judging whether the receiving unit receives the optical test signal in a judging unit.

According to the present invention, it is possible to provide an optical node apparatus, a method for checking a connection in the optical node apparatus, and a program thereof which can check normality on the connection in the optical node apparatus with ease and can avoid a false connection and interference with a main signal of an operative system due to the false connection.

BRIEF DESCRIPTION OF THE DRAWINGS

Exemplary features and advantages of the present invention will become apparent from the following detailed description when taken with the accompanying drawings in which.

EXEMPLARY EMBODIMENT

Next, an exemplary embodiment to carry out the present invention will be described in detail with reference to a drawing. Here, a common part or a corresponding part among the figures has the same code in each figure, and description on the common part or the corresponding part is simplified suitably or omitted. As a simple summary on the exemplary embodiment, normality on connecting units each other in an node through an optical patch cord, and normality on setting an adding and dropping of an optical wavelength are checked by use of a connection detecting light, which is different from a main signal, before a system starts operation. As a result, it is possible to make a work for checking the normality on the connection easy, and furthermore it is possible that the system starts the operation after the normal connection is achieved surely. Then, it is possible to avoid a false connection and interference with the main signal of the system which is in an operative state.

First Exemplary Embodiment

Figure 1:
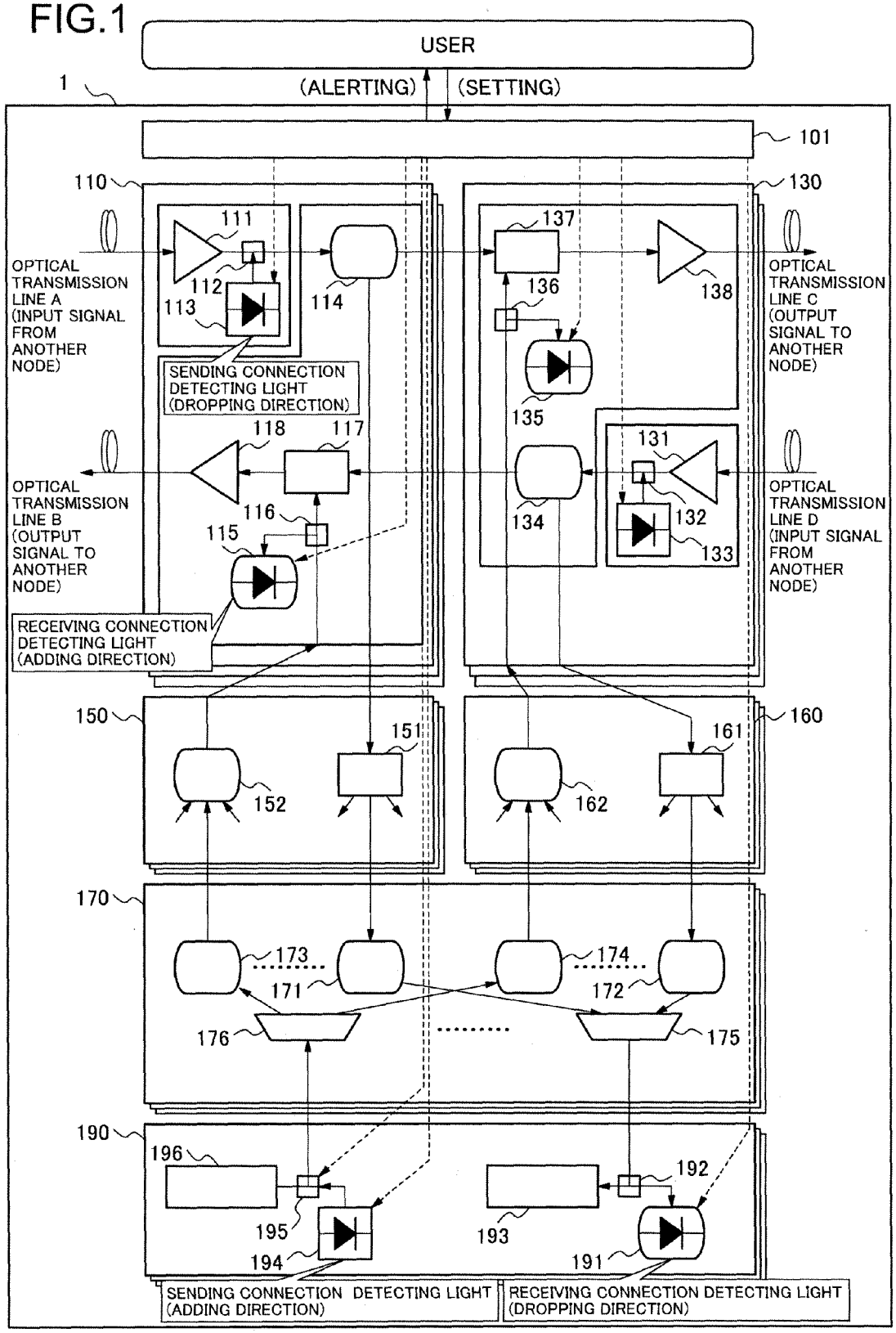
FIG. 1 is a schematic diagram showing a configuration of an optical node apparatus (ROADM node) according to an exemplary embodiment of the present invention.

FIG. 1 is a schematic diagram showing a configuration of an optical node apparatus 1 (ROADM node 1) according to a first exemplary embodiment of the present invention. As the first exemplary embodiment, FIG. 1 shows the configuration of the ROADM node 1 which has a function to check normality on connecting units each other in the node by use of an optical patch cord, and normality on setting an adding and dropping of an optical wavelength.

According to FIG. 1, the ROADM node 1 includes, as a function block, an apparatus controlling and managing unit 101, optical cross-connect units 110 and 130, wavelength selecting units 150 and 160, a light splitting and selecting unit 170 and a transponder unit 190.

The optical cross-connect unit 110 includes a receiving side amplifying part 111, a sending band coupler part 112, a connection detecting light sending part 113 and a light distributing part 114. Furthermore, the optical cross-connect unit 110 includes a connection detecting light receiving part 115, a receiving band coupler part 116, a wavelength selecting and connecting part 117 and a sending side amplifying part 118.

The optical cross-connect unit 130 includes a receiving side amplifying part 131, a sending band coupler part 132, a connection detecting light sending part 133 and a light distributing part 134. Furthermore, the optical cross-connect unit 130 includes a connection detecting light receiving part 135, a receiving band coupler part 136, a wavelength selecting and connecting part 137 and a sending side amplifying part 138.

The wavelength selecting unit 150 includes a wavelength selecting part 151 and an optical coupler part 152. The wavelength selecting unit 160 includes a wavelength selecting part 161 and an optical coupler part 162.

The light splitting and selecting unit 170 includes a receiving light splitting parts 171 and 172, a sending light splitting parts 173 and 174, a receiving light switching part 175 and a sending light switching part 176.

The transponder unit 190 includes a connection detecting light receiving part 191, a receiving light band coupler part 192, a main signal receiving part 193, a connection detecting light sending part 194, a sending light band coupler part 192 and a main signal sending part 196.

In order to check the normality on the connection in a direction of dropping the optical wavelength, the ROADM node 1 includes the connection detecting light sending parts 113 and 133 and the connection detecting light receiving part 191. A connection detecting light, which is outputted by the connection detecting light sending part 113 or the connection detecting light sending part 133, is coupled with a main signal path by the sending light band coupler part 112 or the sending light band coupler part 132 respectively. Then, the connection detecting light is passed through the light distributing part 114 or the light distributing part 134, the wavelength selecting part 151 or the wavelength selecting part 161, and the receiving light splitting part 171 or the receiving light splitting part 172 respectively to be inputted into the receiving light switching part 175. The connection detecting light, which is inputted into the receiving light switching part 175, is passed through the receiving light band coupler part 192 to be received by the connection detecting light receiving part 191.

In order to check the normality of the connection in a direction of adding the optical wavelength, the ROADM node 1 shown in FIG. 1 includes the connection detecting light sending part 194, the connection detecting light receiving part 115 and the connection detecting light receiving part 135. The connection detecting light, which is outputted by the connection detecting light sending part 194, is inputted into the sending light switching part 176. The connection detecting light, which is outputted by the sending light switching part 176, is passed through the sending light splitting part 173 or the sending light splitting part 174, and the optical coupler part 152 or the optical coupler part 162 to be inputted into the receiving light band coupler part 116 or the receiving light band coupler part 136 respectively. The connection detecting light, which is inputted into the receiving light band coupler part 116 or the receiving light band coupler part 136, is received by the connection detecting light receiving part 115 or the connection detecting light receiving part 135 respectively.

The apparatus controlling and managing unit 101 carries out the control to send the connection detecting light to the connection detecting light sending parts 113, 133 and 194 and to stop sending the connection detecting light. Moreover, the apparatus controlling and managing unit 101 checks whether an expected connection destination such as the connection detecting light receiving parts 115, 135 and 191 receives the connection detecting light, and the apparatus controlling and managing unit 101 judges the normality on the connection on the basis of a result of the check. When the apparatus controlling and managing unit 101 can not judge that the connection is normal, the apparatus controlling and managing unit 101 issues a rumbling alert, and advises a user of checking and correcting the connection. That is, the apparatus controlling and managing unit 101 has a function to check normality on a connection quality on the basis of a light level which is detected by the connection detecting light receiving parts 115, 135 or 191.

In the case that the connection detecting light sending parts 113, 133 or 194 detects a reflection light, the apparatus controlling and managing unit 101 judges that a point not connected exists or an optical connector becomes soiled, and consequently the apparatus controlling and managing unit 101 issues the rumbling alert. Then, the apparatus controlling and managing unit 101 advises the user of carrying out a work for checking the connection point and a work of cleaning the optical connector. Here, it is possible to detect the state of being not connected, and the soil of the optical connector through mounting reflection monitors on the connection detecting light sending parts 113, 133 and 194, and monitoring the reflection level of the connection detecting light.

While the configuration according to the first exemplary embodiment of the present invention has been described in detail as mentioned above, each configuration and each function of the receiving side amplifying parts 111 and 131, the light distributing parts 114 and 134 and the wavelength selecting parts 151 and 161 of the ROADM node shown in FIG. 1 are well-known by a person skilled in the art. Moreover, each configuration and each function of the receiving light splitting parts 171 and 172, the receiving light switching part 175, the main signal receiving part 193 and the main signal sending part 196 are also well-known by the person skilled in the art. Furthermore, the sending light switching part 176, the sending light splitting parts 173 and 174, the optical coupler parts 152 and 162, the wavelength selecting and connecting parts 117 and 137 and the sending side amplifying parts 118 and 138 are also well-known by the person skilled in the art. Since the well-known configurations have no direct relation to the essence of the present invention, detailed description on the configurations is omitted.

Figure 2:
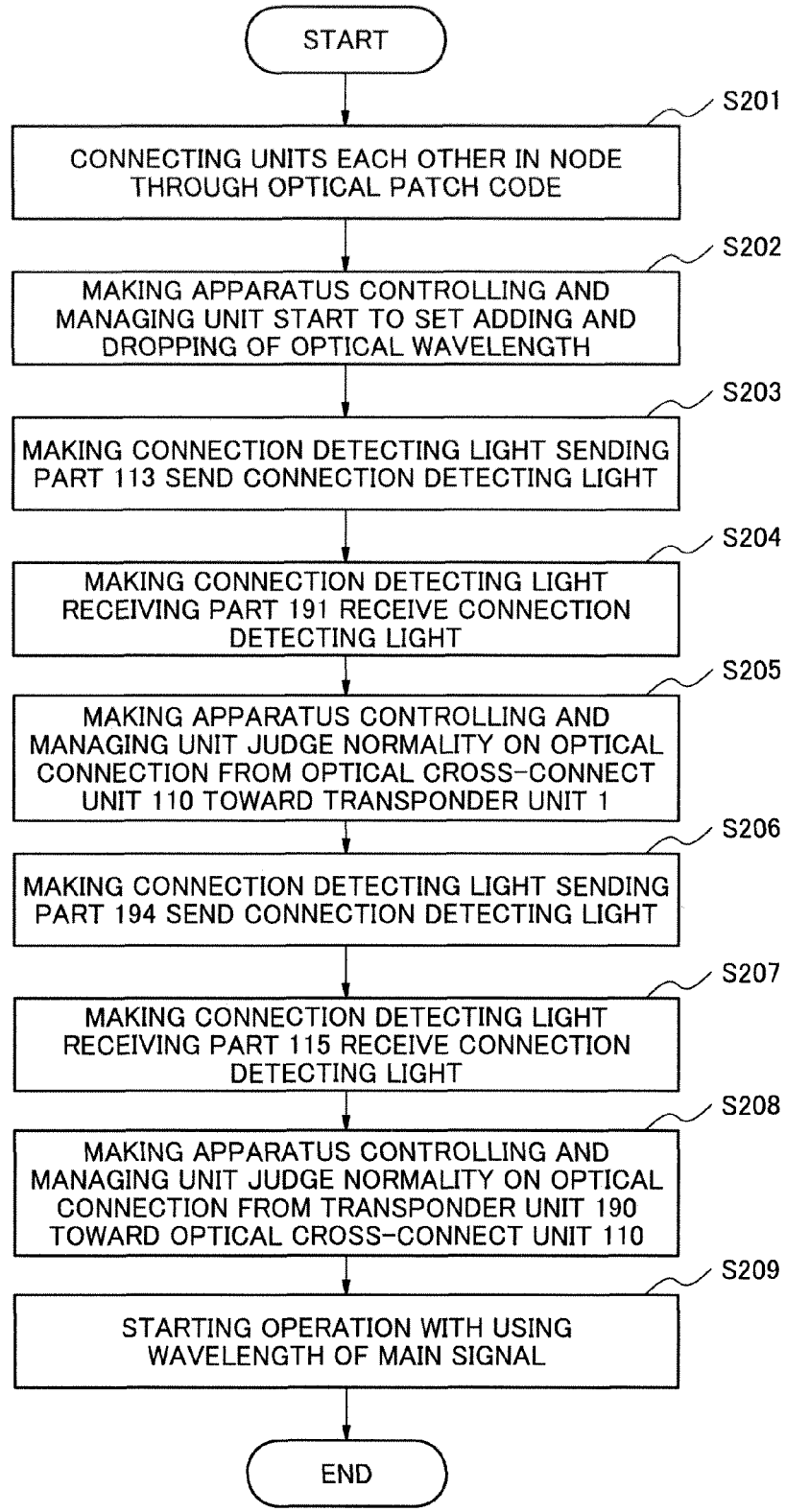
FIG. 2 is a flow chart showing a method for checking a connection in the optical node apparatus (ROADM node) according to the exemplary embodiment of the present invention.

Next, an operation of the ROADM node 1 according to the first exemplary embodiment of the present invention will be described. FIG. 2 is a flow chart showing a method for checking the connection in the optical node apparatus (ROADM node) according to the exemplary embodiment of the present invention. Specifically, FIG. 2 shows a procedure to add the optical route and the transponder with checking the normality on the connection.

First, the units in the ROADM are connected each other through the optical patch cord which is not shown in the figure (Step 201 (hereinafter, Step is abbreviated as S)). Then, the apparatus controlling and managing unit 101 starts setting the adding and dropping of the optical wavelength (S202).

Next, the connection detecting light sending part 113 sends the connection detecting light whose wavelength is different from one of the main signal (S203). The connection detecting light is coupled with the main signal path by the sending light band coupler part 112, and is passed through the light distributing part 114, the wavelength selecting part 151, the receiving light splitting part 171 and the receiving light switching part 175 to be inputted into the receiving light band coupler part 192.

Since the receiving light band coupler part 192 has a function to distribute a signal on the basis of a wavelength, the connection detecting light is transferred toward the connection detecting light receiving part 191. The connection detecting light is received by the connection detecting light receiving part 191 (S204), and the apparatus controlling and managing unit 101 checks whether the connection detecting light is received by the expected connection destination, and judges that the connection is normal if the connection detecting light is received (S205).

When the apparatus controlling and managing unit 101 does not judges that the connection is normal, the apparatus controlling and managing unit 101 issues the rumbling alert and advises the user of checking and correcting the connection. Moreover, in the case that the reflection light is detected on the basis of the light level which is detected by the connection detecting light sending part 113, the apparatus controlling and managing unit 101 judges that a point not connected exists or an optical connector becomes soiled. Then, the apparatus controlling and managing unit 101 issues the rumbling alert, and advises the user of carrying out the work for checking the connection point and the work of cleaning the optical connector. Furthermore, the apparatus controlling and managing unit 101 judges the normality on the connection quality on the basis of the light level which is detected by the connection detecting light receiving part 191. As a result, the normality on the optical connection from the optical cross-connect unit 110 toward the transponder unit 190 is judged (S205).

Next, the connection detecting light sending part 194 sends the connection detecting light having the wavelength which is used for detecting the connection and which is different from one of the main signal (S206). The connection detecting light is coupled with the main signal path by the sending light band coupler part 195, and is passed through the sending light switching part 176, the sending light splitting part 173 and the optical coupler part 152 to be inputted into the receiving light band coupler part 116.

Since the receiving light band coupler part 176 has a function to distribute a signal on the basis of a wavelength, the connection detecting light is transferred toward the connection detecting light receiving part 115. The connection detecting light is received by the connection detecting light receiving part 115 (S207), and the apparatus controlling and managing unit 101 checks whether the connection detecting light is received by the expected connection destination, and judges that the connection is normal if the connection detecting light is received (S208).

When the apparatus controlling and managing unit 101 does not judges that the connection is normal, the apparatus controlling and managing unit 101 issues the rumbling alert and advises the user of checking and correcting the connection. Moreover, in the case that the reflection light is detected on the basis of the light level which is detected by the connection detecting light sending part 194, the apparatus controlling and managing unit 101 judges that a point not connected exists or an optical connector becomes soiled. Then, the apparatus controlling and managing unit 101 issues the rumbling alert, and advises the user of carrying out the work for checking the connection point and the work of cleaning the optical connector. Furthermore, the apparatus controlling and managing unit 101 judges the normality on the connection quality on the basis of the light level which is detected by the connection detecting light receiving part 115. As a result, the normality of the optical connection from the transponder unit 190 toward the optical cross-connect unit 110 is judged (S208).

When a series of the checking processes, in which the connection detecting light is used, is completed, the system starts an actual operation with using the wavelength of the main signal (S209).

As mentioned above, the ROADM node 1 according to the first exemplary embodiment has an effect that it is easy to check the normality on the connection in the node, and it is possible to avoid the false connection and the influence caused by the interference with the main signal of the operative system due to the false connection.

Here, while the case that the function blocks of the ROADM are connected each other through the optical patch cord is described in the first exemplary embodiment, the connection between the function blocks is not limited to the connection through the optical patch cord. It is enough that the connection is formed through an optical transmission line.

Moreover, while it is described in the first exemplary embodiment that the wavelength of the connection detecting light is different from one of the main signal, it may be preferable that the wavelength of the connection detecting light is the same as one of the main signal. In this case, the same work and the same effect as ones according to the first exemplary embodiment can be obtained through using optical splitters instead of the receiving band coupler parts 116, 136 and 192 and the sending band coupler parts 112, 132 and 195.

An optical node apparatus, which has a configuration that a plurality of function units are connected each other through an optical transmission line, also has the effect according to the first exemplary embodiment. The specific configuration will be described in the following. The optical node apparatus, whose plural function units are connected through the optical transmission line, includes a control means (apparatus controlling and managing unit 101), a sending means (connection detecting light sending part 113) and a receiving means (connection detecting light receiving part 191). The control means carries out control to send an optical test signal and to stop sending the optical test signal. The sending means sends the optical test signal on the basis of an instruction issued by the control means. The receiving means receives the optical test signal, which is sent by the sending means, through the optical transmission line (for example, optical patch cord). Moreover a discriminating means (apparatus controlling and managing unit 101) discriminates whether the receiving means receives the optical test signal.

According to the optical node apparatus which has the above-mentioned configuration, the optical test signal, which is sent by the sending means on the basis of the control carried out by the control means, is sent to the receiving means through the optical transmission line which makes the function units connected each other. The discriminating means discriminates whether the receiving means receives the optical test signal. Accordingly, it is possible that the optical node apparatus, which has the above-mentioned configuration, checks the normality on the connection in the node with ease, and it is possible to avoid the false connection and the influence caused by the interference with the main signal of the operative system due to the false connection.

A Second Exemplary Embodiment

Figure 3:
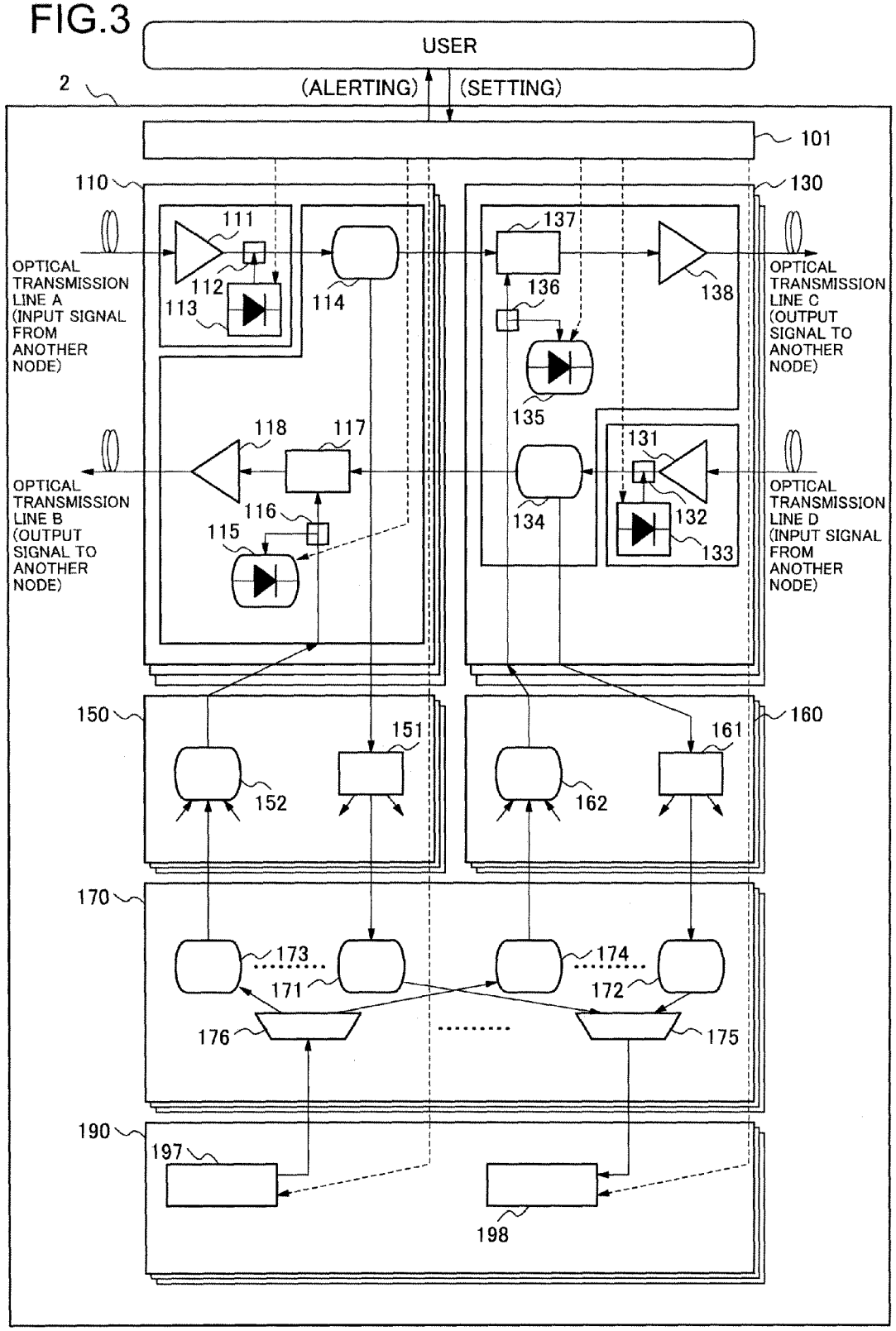
FIG. 3 is a schematic diagram showing a configuration of the optical node apparatus (ROADM node) according to another exemplary embodiment 1 of the present invention.

Next, a second exemplary embodiment of the present invention will be described. While a basic configuration of a ROADM node according to the second exemplary embodiment is the same as that according to the first exemplary embodiment, the ROADM node according to the second exemplary embodiment is enhanced in the method for sending and receiving the connection detecting light. The configuration of the ROADM node will be described with reference to FIG. 3. FIG. 3 is a schematic diagram showing a configuration of an optical node apparatus 2 (ROADM node 2) according to the second exemplary embodiment of the present invention. Here, a constituent in FIG. 3, which is common to the constituent in FIG. 1, has the same code as that of the constituent in FIG. 1, and therefore detailed description on the common constituent in FIG. 3 is omitted. According to the ROADM node 2 shown in FIG. 3, the connection detecting light sending part 194, the sending light band coupler part 195 and the main signal sending part 196, which are mounted on the transponder unit 190 according to the first exemplary embodiment, are united into a main signal and connection detecting light sending part 197. Furthermore, according to the ROADM node 2, the connection detecting light receiving part 191 and the main signal receiving part 193 are united into a main signal and connection detecting light receiving part 198. The main signal and connection detecting light sending part 197, which includes a light sending section having a function to send a variable wavelength, varies a sending wavelength to a wavelength of the connection detecting light. As a result it is possible to realize to send the connection detecting light. Moreover, the main signal and connection detecting light receiving part 198, which includes a light receiving section having a function to receive a variable wavelength, sets a reception wavelength to the wavelength of the connection detecting light. As a result it is possible to realize to receive the connection detecting light.

A Third Exemplary Embodiment

Figure 4:
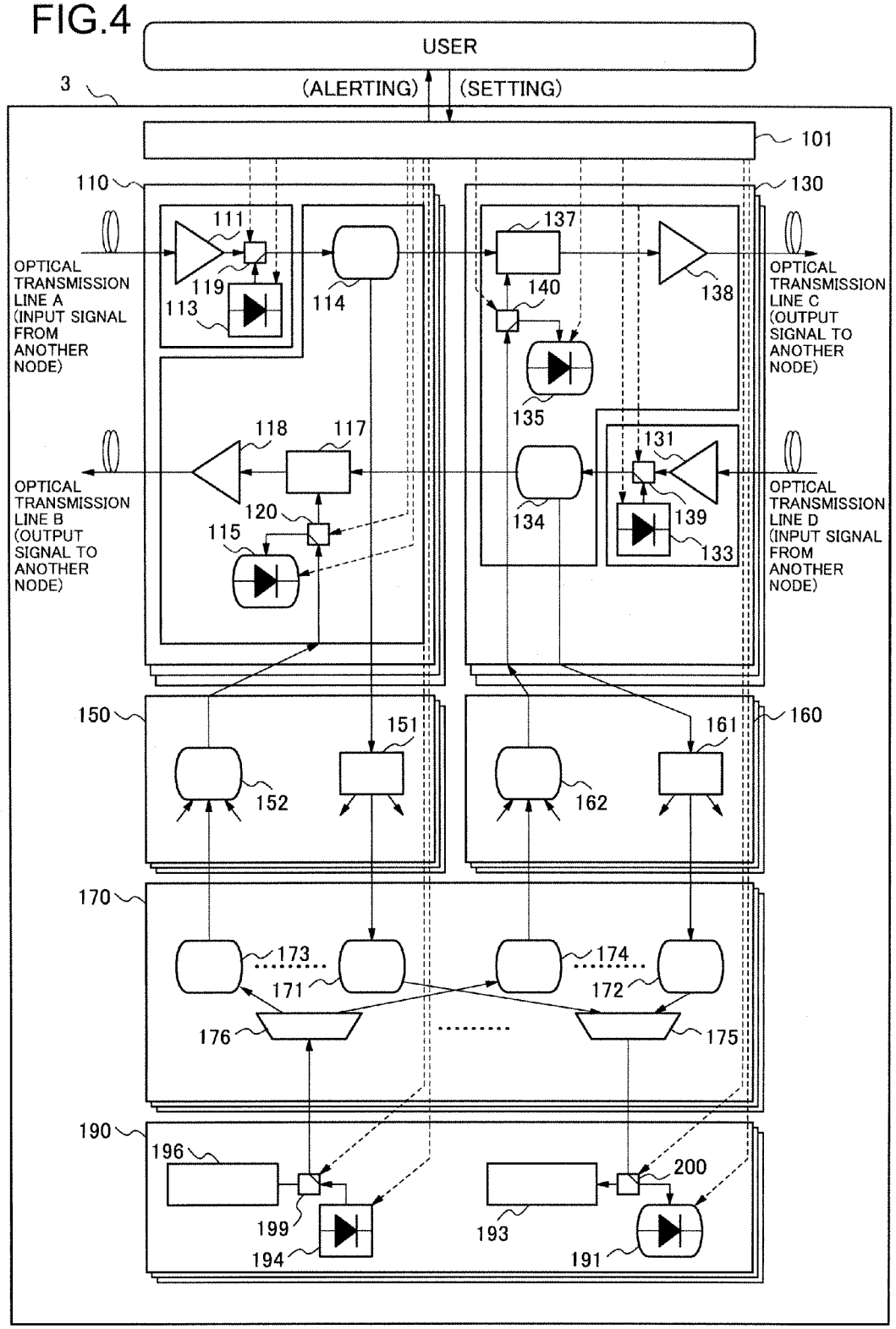
FIG. 4 is a schematic diagram showing a configuration of the optical node apparatus (ROADM node) according to another exemplary embodiment 2 of the present invention.

FIG. 4 is a schematic diagram showing a configuration of an optical node apparatus 3 (ROADM node 3) according to a third exemplary embodiment of the present invention. According to the ROADM node 3 shown in FIG. 4, the sending light band coupler parts 112, 132 and 195 shown in FIG. 1 are replaced by sending light selecting switch parts 119, 139 and 199 respectively. Moreover, according to the ROADM node 3, the receiving light band coupler parts 116, 136 and 192 are replaced by receiving light selecting switch parts 120, 140 and 200 respectively. According to the ROADM node 3, each of the optical switch parts carries out a switch work with being synchronized with sending the connection detecting light and stopping to send the connection detecting light, on the basis of control carried out by the apparatus controlling and managing unit 101. As a result, the ROADM node realizes the same function as those of the ROADM nodes according the first and second exemplary embodiments.

A Fourth Exemplary Embodiment

Figure 5:
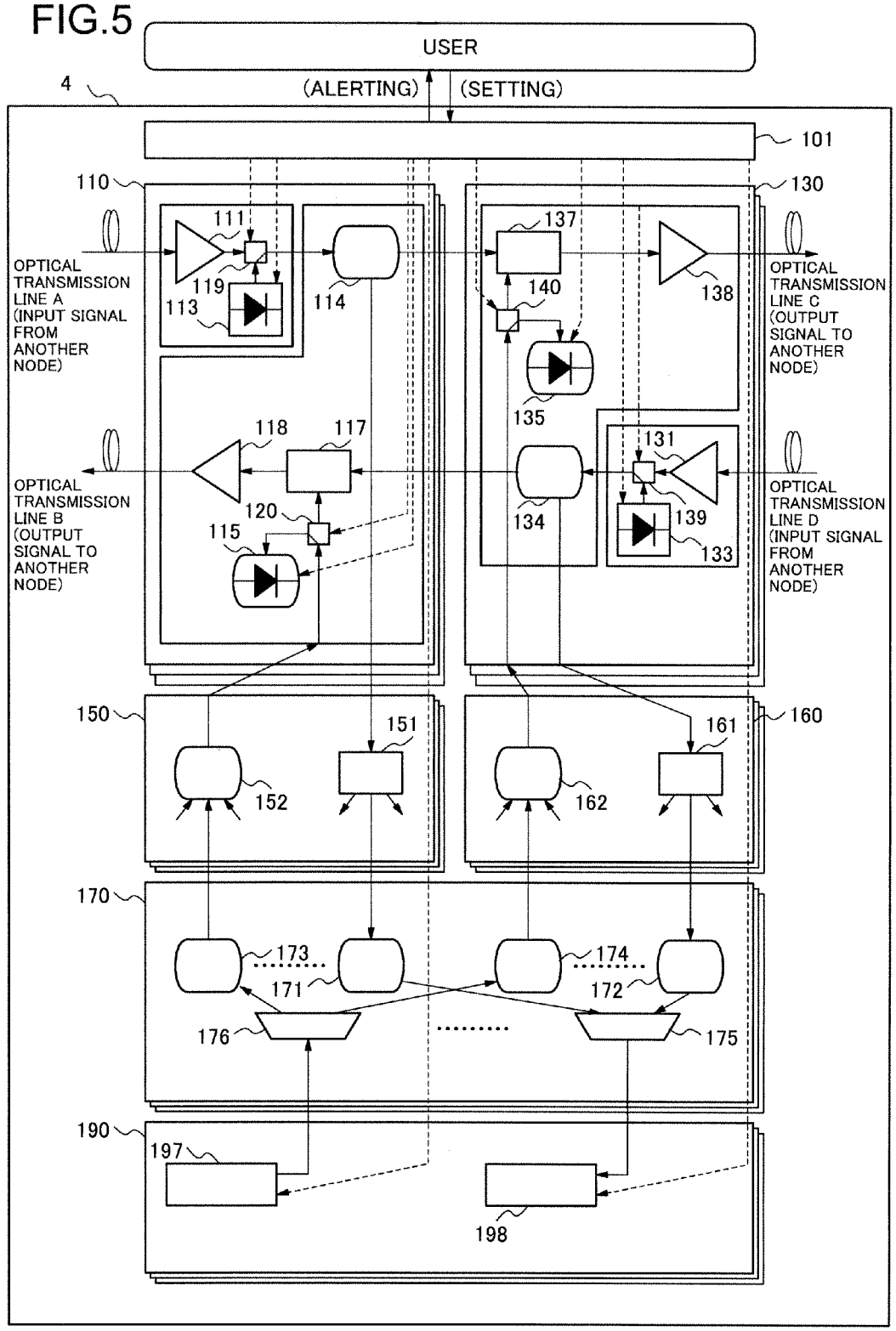
FIG. 5 is a schematic diagram showing a configuration of the optical node apparatus (ROADM node) according to another exemplary embodiment 3 of the present invention.

FIG. 5 is a schematic diagram showing a configuration of an optical node apparatus 4 (ROADM node 4) according to a fourth exemplary embodiment of the present invention. The ROADM node 4 shown in FIG. 5 includes the main signal and connection detecting light sending part 197 and the main signal and connection detecting light receiving part 198. Furthermore, the ROADM node 4 includes the sending light selecting switch parts 119, 139 and 199 and the receiving light selecting switch parts 120, 140 and 200. That is, the ROADM 4 has a feature which includes both the feature of the ROADM node 2 according to the second exemplary embodiment and the feature of the ROADM node 3 according to the third exemplary embodiment.

A Fifth Exemplary Embodiment

Figure 6:
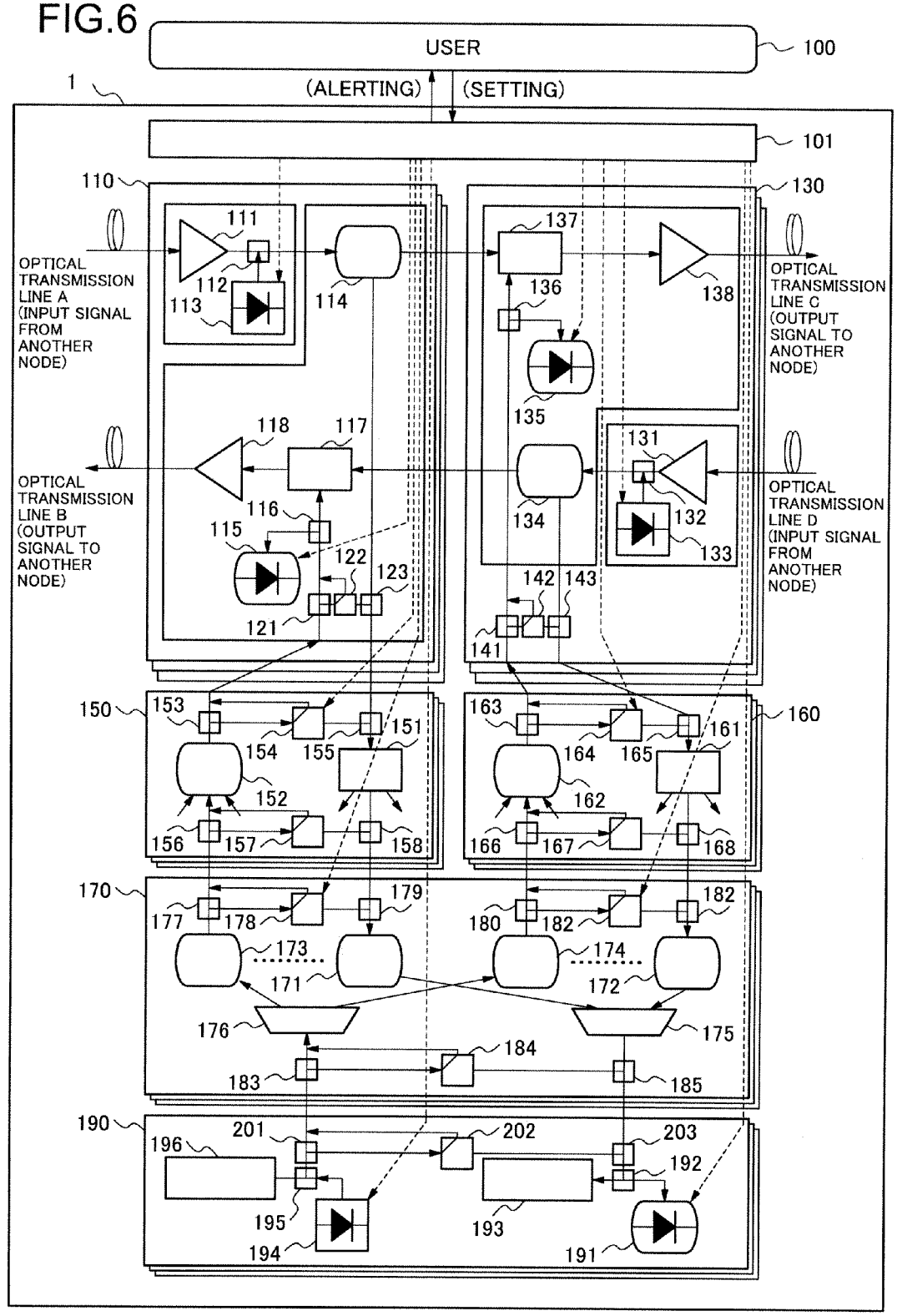
FIG. 6 is a schematic diagram showing a configuration of the optical node apparatus (ROADM node) according to another exemplary embodiment 4 of the present invention.
Figure 7:
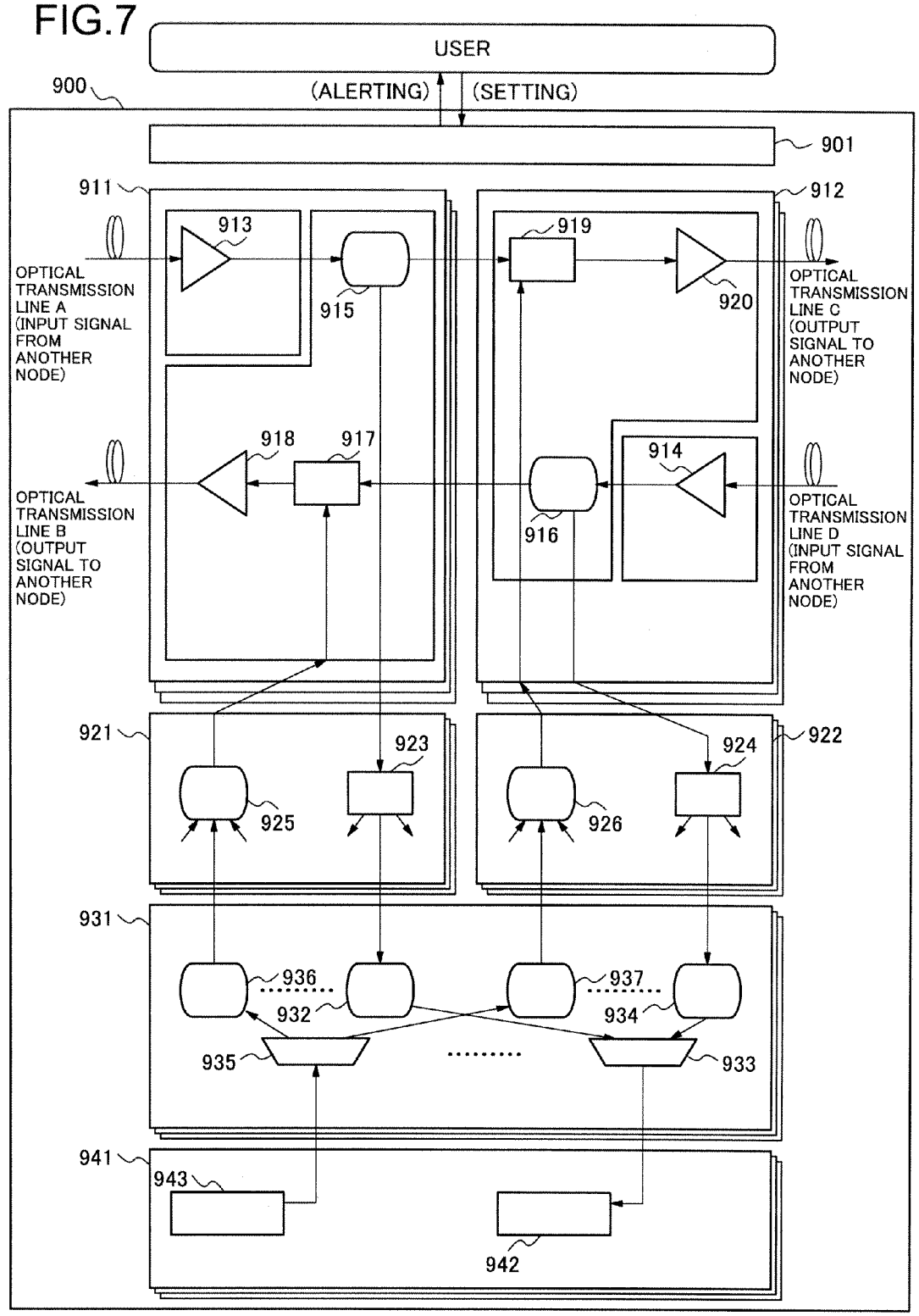
FIG. 7 is a block diagram showing a configuration of a ROADM node related to the present application.

FIG. 6 is a schematic diagram showing a configuration of an optical node apparatus 5 (ROADM node 5) according to a fifth exemplary embodiment of the present invention. The ROADM node 5 includes sending light band coupler parts 121, 141, 153, 156, 163, 166, 177, 180, 183 and 201 on optical paths of a sending light in units of the node as shown in FIG. 6. Moreover, the ROADM node 5 includes receiving light band coupler parts 123, 143, 155, 158, 165, 168, 179, 182, 185 and 203 on optical paths of a receiving light in the units. Furthermore, the ROADM node 5 has loop back switch parts 122, 142, 154, 157, 164, 167, 178, 181, 184 and 202 between the sending light band coupler parts 121, 141, 153, 156, 163, 166, 177, 180, 183 and 201 and the receiving light band coupler parts 123, 143, 155, 158, 165, 168, 179, 182, 185 and 203 respectively. The apparatus controlling and managing unit 101 controls the loop back switch parts. As a result, it is possible that the connection detecting light receiving part receives the connection detecting light which is loop-backed by each loop back switch part.

The ROADM node 5 can loop-back only the connection detecting light by use of the sending light band coupler part, the receiving light band coupler part, and the loop back switch part, which is arranged between the sending light band coupler part and the receiving light band coupler part, with causing no influence on the main signal. The loop back switch part is controlled so that the connection detecting light may be returned and connected to the path of the main signal at a usual time. In this case, it is possible to check a range of the normal connection in addition to checking the normality on the connection.

As described above, each of the ROADM nodes 1 to 5 according to the first to the fifth exemplary embodiments respectively, which includes the connection detecting light sending part and the connection detecting light receiving part, receives the connection detecting light, which is sent from the connection detecting light sending part, by use of the connection detecting light receiving part. The ROADM nodes 1 to 5, which have the above-mentioned configurations, can check the normality on the connection in the node. When the ROADM nodes 1 to 5 check the normality on the connection, each of the ROADM nodes 1 to 5 uses the connection detecting light which has the wavelength different from that of the main signal. For this reason, it is possible that each of the ROADM nodes 1 to 5 checks the normality on the connection in the node without causing the interference with the operative main signal.

Moreover, each of the ROADM nodes 1 to 5 can send the connection detecting light and stop sending the connection detecting light, and check the normality on the connection remotely through making the apparatus controlling and managing unit control the connection detecting light sending part and the connection detecting receiving part. When it is not judged that the connection is normal, the apparatus controlling and managing unit issues the rumbling alert. As a result, the user can notice the false connection instantaneously, and then the user can check and correct the connection in the node.

Furthermore, in the case that the connection detecting light sending part of the ROADM nodes 1 to 5 includes the reflection monitor, it is possible to detect the state of being not connected, and the soil of the optical connector through monitoring the reflection level of the connection detecting light. Furthermore, through the connection detecting light receiving part's monitoring the optical level of the connection detecting light, it is possible to judge the connection quality in the node.

While the invention has been particularly shown and described with reference to the exemplary embodiments thereof, the invention is not limited to these embodiments. It will be understood by those of ordinary skill in the art that various changes in form and details may be made therein without departing from the spirit and scope of the present invention as defined by the claims.

The whole or part of the exemplary embodiments disclosed above can be described as, but not limited to, the following supplementary notes.

(Supplementary note 1) An optical node apparatus whose plural function units are connected each other through an optical transmission line, comprising:

a control unit which carries out control to send an optical test signal and to stop sending the optical test signal;

a sending unit which sends the optical test signal on the basis of an instruction issued by the control unit;

a receiving unit which receives the optical test signal sent by the sending unit through the optical transmission line; and a discriminating unit which discriminates whether the receiving unit receives the optical test signal.

(Supplementary note 2) The optical node apparatus according to Supplementary note 1, further comprising:

a notifying unit which notifies that the connection through the optical transmission line is abnormal, when the discriminating unit discriminates that the optical test signal is not received.

(Supplementary note 3) The optical node apparatus according to Supplementary note 2, wherein the sending unit furthermore comprises a judging unit which judges whether the optical test signal is reflected, and wherein the notifying unit notifies that the connection through the optical transmission line is abnormal when the judging unit judges that the optical test signal is reflected.

(Supplementary note 4) The optical node apparatus according to Supplementary note 1, wherein the optical test signal has a wavelength different from a wavelength of an optical signal which is used when the optical node apparatus is in an operative state.

(Supplementary note 5) The optical node apparatus according to Supplementary note 1, further comprising:

a separating and coupling unit which separates the optical test signal and an optical signal which is used when the optical node apparatus is in an operative state, and couples the optical test signal and the optical signal together.

(Supplementary note 6) The optical node apparatus according to Supplementary note 5, wherein the separating and coupling unit separates the optical test signal and the optical signal which is used when the optical node apparatus is in the operative state, and couples the optical test signal and the optical signal together on the basis of a difference in a wavelength.

(Supplementary note 7) The optical node apparatus according to Supplementary note 1, wherein the discriminating unit discriminates on the basis of a receiving level of the optical test signal which the receiving unit receives, and wherein the judging unit judges on the basis of a reflection level of the optical test signal.

(Supplementary note 8) The optical node apparatus according to Supplementary note 1, wherein any one of the function units includes a main signal and test signal sending unit to which a main signal sending unit to send the optical signal used when the optical node is in the operative state, and a test signal sending unit to send the optical test signal are united, and includes a main signal and test signal receiving unit to which a main signal receiving unit to receive the optical signal used when the optical node is in the operative state, and a test signal receiving unit to receive the optical test signal are united.

(Supplementary note 9) The optical node apparatus according to Supplementary note 1, further comprising:

a loop back switch unit arranged on a path, on which the optical test signal passes, in order to specify an abnormal point of the connection through the optical transmission line.

(Supplementary note 10) The optical node apparatus according to Supplementary note 1, wherein the optical node apparatus is a ROADM (Reconfigurable Optical Add Drop Multiplexer) node apparatus whose function units include an optical cross-connect unit, a wavelength selecting unit, a light splitting and selecting unit, and a transponder unit.

(Supplementary note 11) A method for checking a connection inside an optical node apparatus whose plural function units are connected each other through an optical transmission line, comprising:

controlling to send an optical test signal and to stop sending the optical test signal in a control unit;

sending the optical test signal on the basis of an instruction issued by the control unit in a sending unit;

receiving the optical test signal, which is sent by the sending unit, through the optical transmission line in a receiving unit; and judging whether the receiving unit receives the optical test signal in a judging unit.

(Supplementary note 12) A storage medium recording substantively a program to check a connection in an optical node apparatus whose plural function units are connected each other through an optical transmission line, wherein the program executes the steps comprising:
controlling to send an optical test signal and to stop sending the optical test signal in a control unit;
sending the optical test signal on the basis of an instruction issued by the control unit in a sending unit;
receiving the optical test signal, which is sent by the sending unit, through the optical transmission line in a receiving unit; and
judging whether the receiving unit receives the optical test signal in a judging unit.

(Supplementary note 13) An optical node apparatus whose plural function units are connected each other through an optical transmission line, comprising:
a control means which carries out control to send an optical test signal and to stop sending the optical test signal;
a sending means which sends the optical test signal on the basis of an instruction issued by the control means;
a receiving means which receives the optical test signal sent by the sending means through the optical transmission line; and
a discriminating means which discriminates whether the receiving means receives the optical test signal.

The invention claimed is:

1. An optical node apparatus whose plural function units are connected to each other through an optical transmission line, the optical node apparatus comprising:
   a control unit which carries out a control to send an optical test signal and to stop sending the optical test signal;
   a sending unit which sends the optical test signal on a basis of an instruction issued by the control unit;
   a receiving unit which receives the optical test signal sent by the sending unit through the optical transmission line;
   a discriminating unit which discriminates whether the receiving unit receives the optical test signal;
   a sending light band coupler arranged on an optical path of the optical test signal;
   a receiving light band coupler arranged on another optical path of the optical test signal; and
   a loop back switch arranged between the sending light band coupler and the receiving light band coupler so that the discriminating unit specifies an abnormal point of the optical path based on the received optical test signal through the loop back switch.

2. The optical node apparatus of claim 1, wherein the optical node apparatus loops back only a connection detecting light by the sending light band coupler, the receiving light band coupler, and the loop back switch.

3. The optical node apparatus of claim 1, wherein the discriminating unit detects an abnormality of an optical connection between the function units internally included in the optical node apparatus.

4. The optical node apparatus of claim 1, wherein the optical transmission line comprises an optical wiring.

5. A method for checking a connection inside an optical node apparatus whose plural function units are connected to each other through an optical transmission line, the method comprising:

controlling to send an optical test signal and to stop sending the optical test signal in a control unit;
sending the optical test signal on a basis of an instruction issued by the control unit in a sending unit;
receiving the optical test signal, which is sent by the sending unit, through the optical transmission line in a receiving unit;
performing a loop-back by a loop back switch which is arranged between a sending light band coupler arranged on an optical path of the optical test signal and the receiving light band coupler arranged on another optical path of the optical test signal; and
discriminating whether the receiving unit receives the optical test signal and specifying an abnormal point of the optical path based on the received optical test signal through the loop back switch.

6. The method of claim 5, wherein the optical node apparatus loops back only a connection detecting light by the sending light band coupler, the receiving light band coupler, and the loop back switch.

7. The method of claim 5, wherein the discriminating unit detects an abnormality of an optical connection between the function units internally included in the optical node apparatus.

8. The method of claim 5, wherein the optical transmission line comprises an optical wiring.

9. A non-transitory storage medium recording substantively a program to check a connection in an optical node apparatus whose plural function units are connected to each other through an optical transmission line, wherein the program executes:
   controlling to send an optical test signal and to stop sending the optical test signal in a control unit;
   sending the optical test signal on a basis of an instruction issued by the control unit in a sending unit;
   receiving the optical test signal, which is sent by the sending unit, through the optical transmission line in a receiving unit;
   performing a loop-back by a loop back switch which is arranged between a sending light band coupler arranged on an optical path of the optical test signal and the receiving light band coupler arranged on another optical path of the optical test signal; and
   discriminating whether the receiving unit receives the optical test signal and specifying an abnormal point of the optical path based on the received optical test signal through the loop back switch.

10. The non-transitory storage medium of claim 9, wherein the optical node apparatus loops back only a connection detecting light by the sending light band coupler, the receiving light band coupler, and the loop back switch.

11. The non-transitory storage medium of claim 9, wherein the discriminating unit detects an abnormality of an optical connection between the function units internally included in the optical node apparatus.

12. The non-transitory storage medium of claim 9, wherein the optical transmission line comprises an optical wiring.

* * * * *